(12) United States Patent
Cui et al.

(10) Patent No.: US 12,342,198 B2
(45) Date of Patent: Jun. 24, 2025

(54) PARALLEL BEAM MANAGEMENT IN NEW BAND COMBINATIONS

(71) Applicant: APPLE INC., Cupertino, CA (US)

(72) Inventors: Jie Cui, Cupertino, CA (US); Yang Tang, San Jose, CA (US); Dawei Zhang, Saratoga, CA (US); Hong He, San Jose, CA (US); Manasa Raghavan, Sunnyvale, CA (US); Huaning Niu, San Jose, CA (US); Panagiotis Botsinis, Munich (DE); Qiming Li, Beijing (CN); Sameh M. Eldessoki, Munich (DE); Herbert R. Dawid, Munich (DE); Silvano Gori, Neubiberg (DE); Christian Hofmann, Munich (DE)

(73) Assignee: Apple Inc., Cupertino, CA (US)

( * ) Notice: Subject to any disclaimer, the term of this patent is extended or adjusted under 35 U.S.C. 154(b) by 222 days.

(21) Appl. No.: 17/441,673

(22) PCT Filed: Oct. 22, 2020

(86) PCT No.: PCT/CN2020/122989
§ 371 (c)(1),
(2) Date: Sep. 21, 2021

(87) PCT Pub. No.: WO2022/082663
PCT Pub. Date: Apr. 28, 2022

(65) Prior Publication Data
US 2022/0303807 A1    Sep. 22, 2022

(51) Int. Cl.
*H04W 24/10* (2009.01)
*H04W 72/044* (2023.01)

(52) U.S. Cl.
CPC ......... *H04W 24/10* (2013.01); *H04W 72/046* (2013.01)

(58) Field of Classification Search
CPC ... H04B 7/0695; H04B 7/06952; H04L 5/001; H04W 24/10; H04W 72/046; H04W 76/15; H04W 24/08
See application file for complete search history.

(56) References Cited

U.S. PATENT DOCUMENTS

| 2019/0281660 A1 | 9/2019 | Cui et al. |
| 2020/0314675 A1 | 10/2020 | Lin et al. |
| 2020/0314676 A1 | 10/2020 | Lin |

(Continued)

FOREIGN PATENT DOCUMENTS

| CN | 110945898 A | 3/2020 |
| CN | 111247752 A | 6/2020 |

(Continued)

OTHER PUBLICATIONS

Samsung. On the Remaining Issues for SCell Beam Failure Recovery RRM Requirement. 3GPP TSG-RAN WG4 Meeting #94-e-Bis, R4-2003541, Apr. 30, 2020 (Apr. 30, 2020).

(Continued)

*Primary Examiner* — Khoa Huynh
(74) *Attorney, Agent, or Firm* — Kilpatrick Townsend & Stockton LLP

(57) ABSTRACT

The present application relates to devices and components including apparatus, systems, and methods for beam management operations in wireless communication systems.

20 Claims, 12 Drawing Sheets

(56) References Cited

U.S. PATENT DOCUMENTS

| | | | |
|---|---|---|---|
| 2021/0144049 A1* | 5/2021 | Lin | H04L 5/001 |
| 2021/0321420 A1* | 10/2021 | Islam | H04L 5/0032 |
| 2022/0109547 A1* | 4/2022 | Svedman | H04L 5/0091 |

FOREIGN PATENT DOCUMENTS

| | | |
|---|---|---|
| CN | 111316573 A | 6/2020 |
| WO | 2020063897 A1 | 4/2020 |
| WO | 2020163357 A1 | 8/2020 |

OTHER PUBLICATIONS

Qualcomm Incorporated. RRM requirements for SCell BFD, and BFR. 3GPP TSG-RAN WG4 Meeting #94, R4-2002121, Mar. 6, 2020 (Mar. 6, 2020).

Notification of Transmittal of the International Search Report and the Written Opinion of the International Searching Authority, International application No. PCT/CN2020/122989, dated Jul. 6, 2021 (1 pp.).

International Search Report, International application No. PCT/CN2020/122989, dated Jul. 6, 2021 (4 pp.).

Written Opinion of the International Searching Authority, International application No. PCT/CN2020/122989, dated Jul. 6, 2021 (5 pp.).

"Further Discussion on SCell BFR Measurements for NR eMIMO", Huawei, HiSilicon, 3GPP TSG-RAN WG4 Meeting #94-e-bis, R4-2004325, Apr. 20-30, 2020, 3 pages.

"Discussion on SCell BFD and CBD requirements for NR eMIMO", Huawei, 3 Generation Partnership Project Technical Specification Group-Radio Access Network Working Group 4 Meeting #95-e, R4-2007770, May 25-Jun. 6, 2020, 2 pages.

"Draft CR to TS38.133 on SCell BFD and CBD (Section 8.5)", Samsung, 3Generation Partnership Project Technical Specification Group-Radio Access Network Working Group4 Meeting #94-e-Bis Electronic Meeting, R4-2005337, Apr. 20-30, 2020, 14 pages.

Chinese Patent Application No. 202080106545.4, "Office Action", Jul. 31, 2024, 10 pages.

European Patent Application No. 20958245.1, "Extended European Search Report", May 31, 2024, 11 pages.

CR to TS38.133 on Introduction of SCell BFD and CBD (Section 8.5), Samsung, 3Generation Partnership Project Technical Specification Group-Radio Access Network Working Group4 Meeting #94-e-Bis Electronic Meeting, R4-2006373, May 25-Jun. 5, 2020, 14 pages.

China Patent Application No. 202080106545.4, Office Action, Mar. 28, 2025, 8 pages.

India Patent Application No. 202317031638, First Examination Report, Mar. 24, 2025, 5 pages.

* cited by examiner

300 

```
┌─────────────────────────────────────────────────────────────────┐
│ receive a first configuration for a first beam management       │
│ operation for a primary serving cell (PCell) that comprises     │
│ beam failure detection (BFD) or candidate beam detection (CBD)  │
│                            304                                  │
└─────────────────────────────────────────────────────────────────┘
                              │
                              ▼
┌─────────────────────────────────────────────────────────────────┐
│ receive a second configuration for a second beam management     │
│ operation for a primary secondary cell (PSCell) that comprises  │
│ BFD or CBD                                                      │
│                            308                                  │
└─────────────────────────────────────────────────────────────────┘
                              │
                              ▼
┌─────────────────────────────────────────────────────────────────┐
│ receive a third configuration for a third beam management       │
│ operation for a secondary serving cell (SCell) that comprises   │
│ BFD or CBD 312                                                  │
└─────────────────────────────────────────────────────────────────┘
                              │
                              ▼
┌─────────────────────────────────────────────────────────────────┐
│ calculate a first evaluation period extension factor for the    │
│ first beam management operation based on the first              │
│ configuration, the second configuration, and the third          │
│ configuration                                                   │
│                            316                                  │
└─────────────────────────────────────────────────────────────────┘
```

|  | PCell | PSCell | SCell(s) |
|---|---|---|---|
| Option 1 | $P_{BFD} = 1$ |  | $P_{BFD} = 1 +$ the number of band(s) on which the UE is performing BFD for SCells |
| Option 2 | $P_{BFD} = 2$ | $P_{BFD} = 2$ | $P_{BFD} =$ the number of band(s) on which the UE is performing BFD for SCells |
| Option 3 | $P_{BFD} = 1$ | $P_{BFD} = 2$ | $P_{BFD} = 2 \times$ the number of band(s) on which the UE is performing BFD for SCells |

500

|  | PCell | PSCell | SCell(s) |
|---|---|---|---|
| Option 1 | Dedicated searcher A | Share searcher B | |
| Option 2 | 1/2 of searcher A | 1/2 of searcher A | Share searcher B |
| Option 3 | Dedicated searcher A | 1/2 of searcher B | Share 1/2 of searcher B |

600

| | PCell | PSCell | SCell(s) |
|---|---|---|---|
| Option 1 | $P_{CBD} = 1$ | \multicolumn{2}{l|}{$P_{CBD}$ = 1 + the number of band(s) on which the UE is performing CBD for SCells} |
| Option 2 | $P_{CBD} = 2$ | $P_{CBD} = 2$ | $P_{CBD}$ = the number of band(s) on which the UE is performing CBD for SCells |
| Option 3 | $P_{CBD} = 1$ | $P_{CBD} = 2$ | $P_{CBD}$ = 2 × the number of band(s) on which the UE is performing CBD for SCells |

| | PCell | PSCell | SCell(s) |
|---|---|---|---|
| Option 1 | $P_{BFD} = 1$ | | $P_{BFD} = 1 +$ the number of band(s) on which the UE is performing BFD or CBD for SCells |
| Option 2 | $P_{BFD} = 2$ | $P_{BFD} = 2$ | $P_{BFD} =$ the number of band(s) on which the UE is performing BFD or CBD for SCells |
| Option 3 | $P_{BFD} = 1$ | $P_{BFD} = 2$ | $P_{BFD} = 2 \times$ the number of band(s) on which the UE is performing BFD or CBD for SCells |

| | PCell | PSCell | SCell(s) |
|---|---|---|---|
| Option 1 | $P_{CBD} = 1$ | | $P_{CBD} = 1 +$ the number of band(s) on which the UE is performing BFD or CBD for SCells |
| Option 2 | $P_{CBD} = 2$ | $P_{CBD} = 2$ | $P_{CBD} =$ the number of band(s) on which the UE is performing BFD or CBD for SCells |
| Option 3 | $P_{CBD} = 1$ | $P_{CBD} = 2$ | $P_{CBD} = 2 \times$ the number of band(s) on which the UE is performing BFD or CBD for SCells |

Figure 8

PARALLEL BEAM MANAGEMENT IN NEW BAND COMBINATIONS

This application is a 35 U.S.C. § 371 National Stage Entry of International Application No. PCT/CN2020/122989, filed on Oct. 22, 2020, which is incorporated herein by reference in its entirety for all purposes.

BACKGROUND

Beam failure detection techniques and candidate beam detection techniques are described in existing Third Generation Partnership Project (3GPP) networks.

BRIEF DESCRIPTION OF THE DRAWINGS

FIG. 3 illustrates an operational flow/algorithmic structure in accordance with some embodiments.

FIG. 6 illustrates a table of extension factor $P_{CBD}$ options in accordance with some embodiments.

FIG. 7 illustrates another table of extension factor $P_{BFD}$ options in accordance with some embodiments.

FIG. 8 illustrates another table of extension factor $P_{CBD}$ options in accordance with some embodiments.

DETAILED DESCRIPTION

Figure 1:
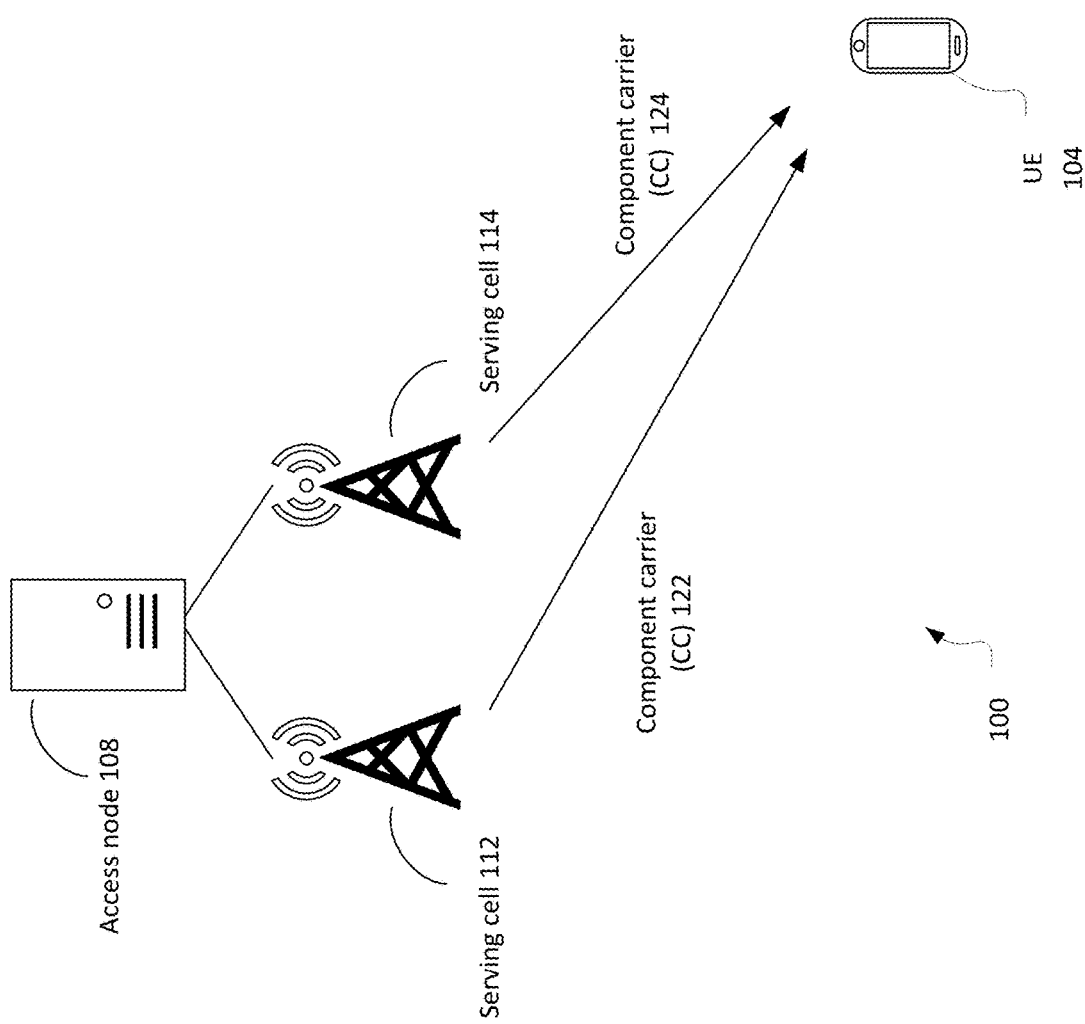
FIG. 1 illustrates a network environment in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

The following is a glossary of terms that may be used in this disclosure.

The term "circuitry" as used herein refers to, is part of, or includes hardware components such as an electronic circuit, a logic circuit, a processor (shared, dedicated, or group) or memory (shared, dedicated, or group), an application specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "computer system" as used herein refers to any type interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to compute, storage, or network resources provided by physical hardware element(s). A "virtualized resource" may refer to compute, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radio-frequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refers to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, virtualized network function, or the like.

The term "information element" refers to a structural element containing one or more fields. The term "field" refers to individual contents of an information element, or a data element that contains content. An information element may include one or more additional information elements.

FIG. 1 illustrates a network environment 100 in accordance with some embodiments. The network environment 100 may include a UE 104 and an access node (or "base station") 108. The access node 108 may provide one or more wireless serving cells 112 and 114, for example, 3GPP New Radio "NR" cells, through which the UE 104 may communicate with the access node 108 (e.g., over an NR-Uu interface).

The UE 104 may include enhanced Multiple-Input-Multiple-Output (eMIMO) capabilities that support simultaneous communication over beams from several (or even many) different serving cells. FIG. 1 shows an example of carrier aggregation (CA), in which the UE 104 receives data from access node 108 simultaneously from serving cell 112 over a component carrier (CC) 122 and from serving cell 114 over a component carrier (CC) 124.

The CC 122 may be in a band in Frequency Range 1 (FR1) or in Frequency Range 2 (FR2). Likewise the CC 124 may be in a band in Frequency Range 1 (FR1) or in Frequency Range 2 (FR2). The CCs 112 and 124 may be in the same band (intra-band, either contiguous or non-contiguous) or may be in different bands (inter-band) and possibly different frequency ranges. For FR1 (e.g., below 7.225 GHz), a transmit antenna of the UE 104 is typically implemented as an omnidirectional antenna. For FR2 (e.g., 24.250 GHz and above, also called mmWave), a transmit antenna of the UE 104 may be implemented as a panel having multiple antenna elements. For example, the multiple antenna elements of a panel may be driven as a phased array (e.g., to direct a beam in a desired direction).

For efficient beam management, the UE 104 may apply radio link monitoring to the serving cells, which may include beam failure detection (BFD) and/or candidate beam detection (CBD). The UE 104 may be configured to monitor the quality of each beam by comparing its signal quality with a threshold that corresponds to a physical downlink control channel (PDCCH) block error rate (BLER) of 10 percent. If BFD indicates beam failure for all of the configured beams (e.g., the signal quality falls below the threshold for all of the beams), the UE 104 may perform CBD. During CBD, the UE 104 identifies one or more candidate beams whose signal strength is above a certain configurable threshold and reports the results (e.g., the beam identifications) to the serving cell. Requirements for BFD and CBD are found, for example, in the 3rd Generation Partnership Project (3GPP) Technical Specification (TS) 38.133 (3GPP TS 38.133 V16.5.0 (2020-09)) entitled "3rd Generation Partnership Project; Technical Specification Group Radio Access Network; NR; Requirements for support of radio resource management (Release 16)" (3GPP, Valbonne, FR) ("TS 38.133"). For example, the evaluation periods for BFD and CBD may be extended for beams in FR2. Multiple CCs in a single band can be expected to experience the same channel conditions (e.g., a common beam), so for intra-band CA, the UE 104 may be configured to perform BFD or CBD on only one of the CCs in a band.

In some embodiments, the UE 104 may include a plurality of searchers that are capable of independently and simultaneously measuring a corresponding plurality of component carriers. The searchers may comprise baseband processing resources that may be used for beam measurement operations. Such measurement resources may include one or more of memory (e.g., buffer space), demodulation processing, and correlation processing. In some embodiments, the UE 104 may include two searchers.

Several agreements have been made regarding a sharing factor in certain multi-band CA use cases:

1) for FR1 inter-band CA, the sharing factor is proportional to the number of bands on which UE is performing BFD/CBD only for SCell, and no scaling factor is introduced for BFD/CBD measurements on PCell/PSCell;

2) for FR2 inter-band CA, the sharing factor is proportional to the number of bands on which UE is performing BFD/CBD only for SCell, and the UE is required to perform BFD/CBD in only one band among a set of bands that it can receive with the common beam;

3) for FR1+FR2 CA, the sharing factor is the sum of the sharing factor of FR1 and the sharing factor of FR2.

These agreements are incorporated into the expressions for $P_{BFD}$ and $P_{CBD}$ as defined in section 8.5 of TS 38.133.

Figure 2:
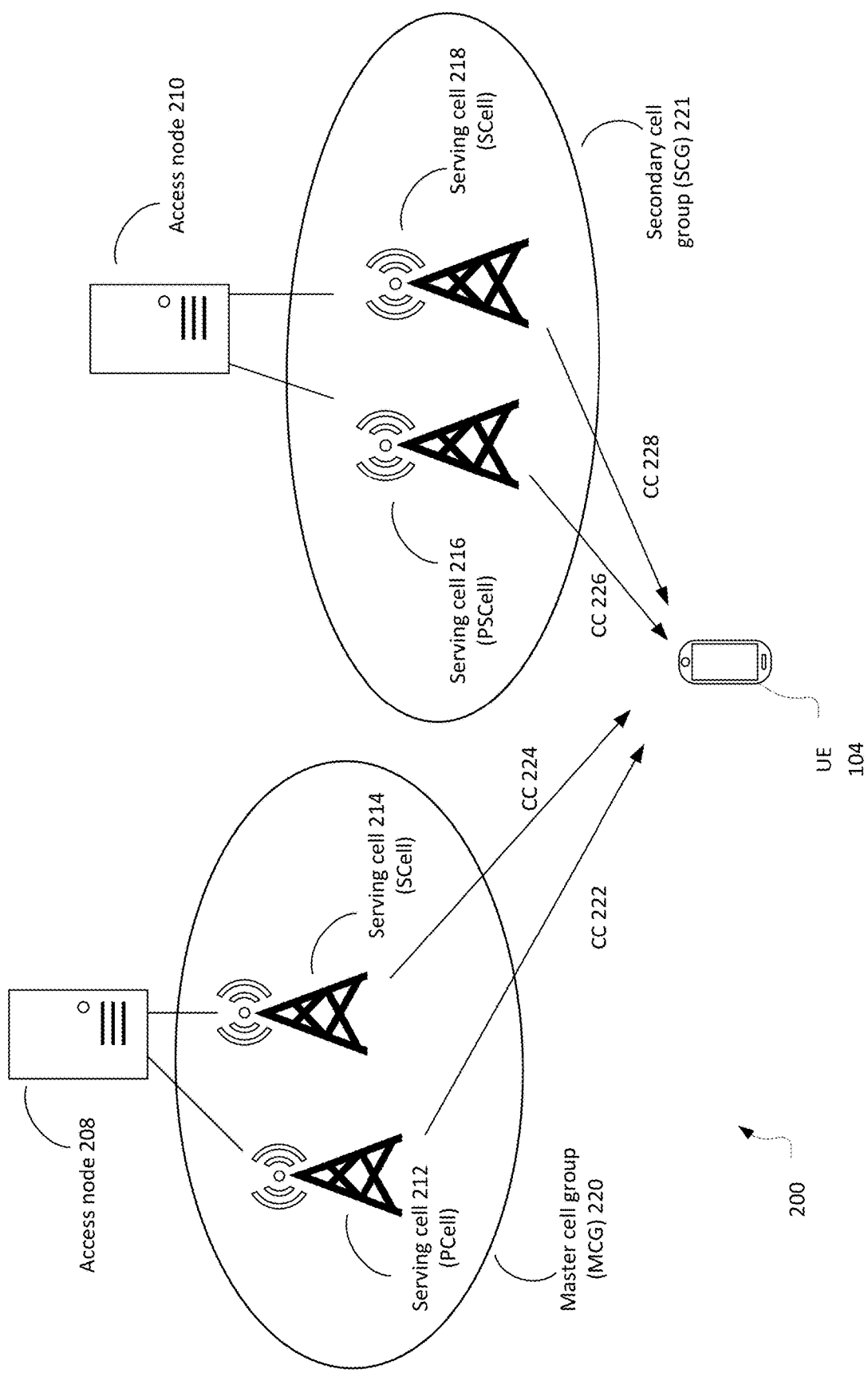
FIG. 2 illustrates a network environment in accordance with some embodiments.

FIG. 2 illustrates a network environment 200 in accordance with some embodiments. The network environment 100 may include the UE 104 and two or more access nodes (or "base stations") 208 and 210. Each of the access nodes 208 and 210 may provide one or more wireless serving cells, for example, 3GPP New Radio "NR" cells, through which the UE 104 may communicate with the access nodes 208 and 210. In this example, access node 208 provides two serving cells 212 and 214 that communicate with the UE 104 over CCs 222 and 224, respectively, and access node 210 provides two serving cells 216 and 218 that communicate with the UE 104 over CCs 226 and 228, respectively.

The UE 104 may communicate with the access nodes 208 and 210 over an air interface compatible with 3GPP technical specifications such as those that define Fifth Generation (5G) NR system standards. Each of the access nodes 208 and 210 may be a next-generation-radio access network (NG-RAN) node that is coupled with a 5G core network. An NG-RAN node may be either a gNB to provide an NR user plane and control plane protocol terminations toward the UE 104 or an ng-eNB to provide evolved universal terrestrial radio access (E-UTRA) user plane and control plane protocol terminations toward the UE 104.

FIG. 2 illustrates an example of dual connectivity (DC), in which the UE 104 may simultaneously transmit and receive data on multiple component carriers (CCs) from two different cell groups. In this example, access node 208 is the master node that provides the control plane connection to the core network, and access node 210 is the secondary node. The master node may be coupled with a 5G core (5GC) network via a backhaul connection that may support an NG-C interface. The serving cells provided by the master node (access node 208 in this example) comprise a master cell group (MCG) 220, and the serving cells provided by the secondary node (access node 210 in this example) comprise a secondary cell group (SCG) 221. Each of the MCG 220 and SCG 221 has a primary serving cell and, optionally, one or more secondary serving cells. A primary serving cell (also called special cell or spCell) of the MCG 220 may be referred to as PCell, and a secondary serving cell of the MCG 221 may be referred to as an SCell. A primary serving cell (spCell) of the SCG 220 may be referred to as PSCell, and a secondary serving cell of the SCG 221 may be referred to as an SCell or SSCell. In FIG. 2, serving cell 212 is the PCell, serving cell 216 is the PSCell, and serving cells 214 and 218 are SCells. The term "primary serving cell" may refer to either one of PCell and PSCell unless otherwise indicated, the term "secondary serving cell" may refer to either one of a secondary serving cell of the MCG and a secondary serving cell of the SCG unless otherwise indicated, and the term "SCell" may also refer to either one of a secondary serving cell of the MCG and a secondary serving cell of the SCG unless otherwise indicated.

As noted above, evaluation periods for BFD and CBD may be extended for beams in FR2. Such extension may be indicated by evaluation period extension factors $P_{BFD}$ and $P_{CBD}$ as described in TS 38.133, which may be used by the UE to allocate measurement resources of the searchers.

Dual connectivity of a UE with two NR cell groups (e.g., as provided by a master gNB and a secondary gNB) is called NR-DC. NR-DC may be desired, for example, in a situation where the backhaul connection between the master access node 208 and the secondary access node 210 is not optimal (e.g., the master access node 208 and the secondary access node 210 are manufactured by different entities, such that they do not share a proprietary interface which might be optimized). In a case of NR-DC, the UE 104 may apply radio link monitoring to the serving cells, which may include beam failure detection (BFD) and/or candidate beam detection (CBD). Unfortunately, the values of factors $P_{BFD}$ and $P_{CBD}$ as described in TS 38.133 provide incorrect results for some NR-DC cases, such as FR1+FR2 NR-DC in which the UE 104 is also configured for inter-band CA in FR2 (e.g., in the SCG). Examples of such new band combinations are specified, for example, in parts 1, 2, and 3 of the 3GPP Technical Specification (TS) 38.101 (3GPP TS 38.101-1/2/3 V16.5.0 (2020-09)) ("TS 38.101"). Table 5.5B.7.2 of part 3 of TS 38.101, for example, specifies several new band combinations that each include two bands from FR1 and a third band from FR2. In such cases, the UE 104 may be configured to perform CBD or BFD on a PCell, a PSCell and one or more SCells on different bands. The values of factors $P_{BFD}$ and $P_{CBD}$ as described in TS 38.133 cannot be used for searcher resource allocation in such cases, as they are inappropriate for situations in which both the PCell and the PSCell are competing for searcher resources. Moreover, the values of factors $P_{BFD}$ and $P_{CBD}$ as described in TS 38.133 may also be inappropriate for mixed cases in which BFD is configured on one or more bands and CBD is configured on one or more other bands.

FIG. 3 illustrates an operation flow/algorithmic structure 300 in accordance with some embodiments. The operation flow/algorithmic structure 300 may be performed or implemented by a UE such as, for example, UE 104 or UE 1000; or components thereof, for example, baseband processor 1004A.

The operation flow/algorithmic structure 300 may include, at 304, receiving a first configuration for a first beam management operation for a primary serving cell (PCell) that comprises beam failure detection (BFD) or candidate beam detection (CBD). The operation flow/algorithmic structure 300 may include, at 308, receiving a second configuration for a second beam management operation for a primary secondary cell (PSCell) that comprises BFD or CBD. The operation flow/algorithmic structure 300 may include, at 312, receiving a third configuration for a third beam management operation for a secondary serving cell (SCell) that comprises BFD or CBD. The first, second, and third configurations may configure one or more reference signals to be used as beam management reference signals. The reference signals may include SSB or CSI-RS resources, which may be indicated in terms of resource elements (where a resource element is a sub-component consisting of a subcarrier in the frequency domain and a symbol interval in the time domain). CSI-RS resources may be identified in a set $\bar{q}_0$ configured for the serving cell, and SSB resources may be identified in a set $\bar{q}_1$ configured for the serving cell.

The configuration may include UE-specific or cell-specific configuration information.

The operation flow/algorithmic structure 300 may include, at 316, calculating (e.g., setting the value of) a first evaluation period extension factor that is based on the first configuration, the second configuration, and the third configuration. In an example of extension enhancement of an SSB based CBD evaluation period, the value of the first evaluation period extension factor $P_{CBD}$ may be calculated, at 316, for PCell, and values of a second evaluation period extension factor $P_{CBD}$ for PSCell, and of a third evaluation period extension factor for any SCells, may also be calculated according to the number of bands on which BFD is configured. In one such example (discussed as Option 2 in the third example below):

1) for each Synchronization Signal Block (SSB) resource in the set 47 configured for PCell, and for each Synchronization Signal Block (SSB) resource in the set 47 configured for PSCell, $P_{CBD}=2$;

2) for each SSB resource in the set $\bar{q}_1$ configured for an SCell, $P_{CBD}$ is the number of band(s) on which UE is performing CBD only for SCell.

Figure 11:
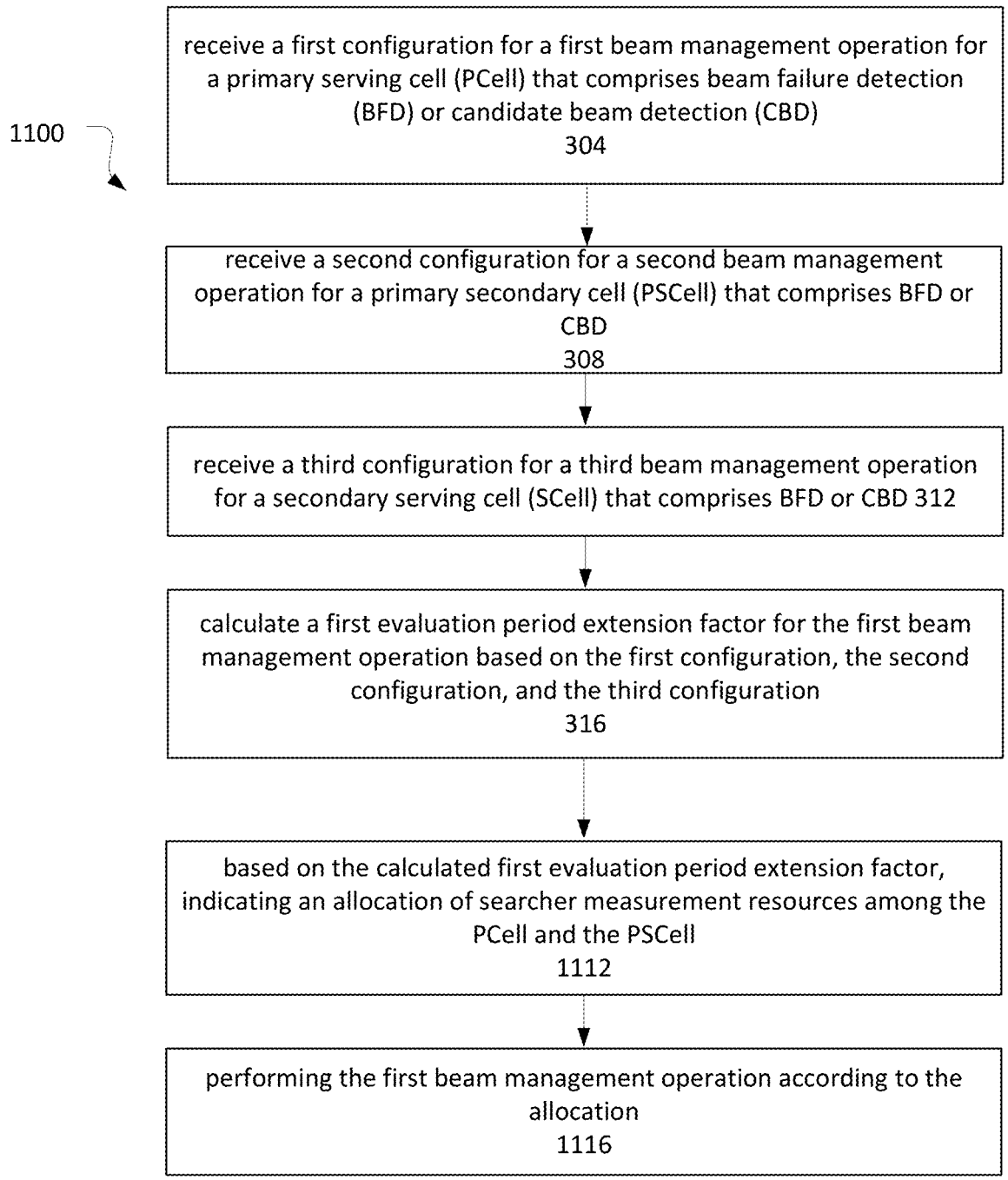
FIG. 11 illustrates another operational flow/algorithmic structure in accordance with some embodiments.

FIG. 11 illustrates an operation flow/algorithmic structure 1100 in accordance with some embodiments. The operation flow/algorithmic structure 1100 may be performed or implemented by a UE such as, for example, UE 104 or UE 1000; or components thereof, for example, baseband processor 1004A.

The operation flow/algorithmic structure 1100 may include the operations 304, 308, 312, and 316 as described herein. The operation flow/algorithmic structure 1100 may further include, at 1112, based on the calculated first evaluation period extension factor, indicating an allocation of searcher measurement resources among the PCell and the PSCell. The allocation of searcher measurement resources comprises an allocation of a portion (possibly all) of a first searcher to the PCell.

The operation flow/algorithmic structure 1100 may further include, at 1116, performing the first beam management operation according to the allocation. The first beam management operation may be BFD or CBD as described herein. In some embodiments, the UE 104 may measure the CBD RS as transmitted by a plurality of candidate beams. In these or other embodiments, the UE 104 may measure the BFD RS as transmitted by a plurality of candidate beams. The UE 104 may select one candidate beam from the plurality of candidate beams based on the measurements.

In a first example, application of the operation flow/algorithmic structures 300 and 1100 to extension enhancement of a CSI-RS based BFD evaluation period is described. In this example, the network and/or the UE 104 may be configured with a minimum assumption that, in case of multiple CCs in a single band, BFD is performed for only one of the CCs in the band.

If only one among the PCell and PSCell has been configured with BFD, then, at 316, the value of $P_{BFD}$ may be set to equal one for each CSI-RS resource in the set $\overline{q_0}$ configured for the PCell or the PSCell, and for each CSI-RS resource in the set $\overline{q_0}$ configured for an SCell, the value of $P_{BFD}$ may be set to equal the number of band(s) on which the UE 104 is performing BFD for SCells.

Figure 4:
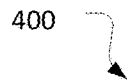
FIG. 4 illustrates a table of extension factor $P_{BFD}$ options in accordance with some embodiments.

However, if both of the PCell and the PSCell have been configured with BFD, then, at 316, for each CSI-RS resource in the set $\overline{q_0}$ configured for the PCell or the PSCell, the value of $P_{BFD}$ may be set according to one of the following three options:

In a first option (Option 1), the value of $P_{BFD}$ may be set to equal one for the PCell, and the value of $P_{BFD}$ for the PSCell may be set to equal one more than the number of band(s) on which the UE 104 is performing BFD for SCells (e.g., the number of band(s) on which the UE 104 is performing BFD for SCells, plus one). For each CSI-RS resource in the set $\overline{q_0}$ configured for an SCell, the value of $P_{BFD}$ may also be set to equal one more than the number of band(s) on which the UE 104 is performing BFD for SCells. These values of $P_{BFD}$ are illustrated in the first row ("Option 1") of the table in FIG. 4.

Figure 5:
FIG. 5 illustrates a table of searcher allocation options in accordance with some embodiments.

If Option 1 is adopted, then, at 1112, allocation of a dedicated measurement resource or searcher to the PCell is indicated, and allocation of another measurement resource or searcher to be shared among the PSCell and the SCells on which the UE 104 is performing BFD is also indicated. This allocation scheme as applied to two searchers (searcher A and searcher B) is illustrated in the first row ("Option 1") of the table in FIG. 5.

In a second option (Option 2), the value of $P_{BFD}$ may be set to equal two for the PCell, and the value of $P_{BFD}$ may be set to equal two for the PSCell as well. For each CSI-RS resource in the set $\overline{q_0}$ configured for an SCell, the value of $P_{BFD}$ may be set to equal the number of band(s) on which the UE 104 is performing BFD for SCells. These values of $P_{BFD}$ are illustrated in the second row ("Option 2") of the table in FIG. 4. If Option 2 is adopted, then, at 1112, allocation of a measurement resource or searcher to be shared among the PCell and the PSCell is indicated. This allocation scheme is illustrated in the second row ("Option 2") of the table in FIG. 5.

In a third option (Option 3), the value of $P_{BFD}$ may be set to equal one for the PCell, and the value of $P_{BFD}$ may be set to equal two for the PSCell. For each CSI-RS resource in the set $\overline{q_0}$ configured for an SCell, the value of $P_{BFD}$ may be set to equal two times the number of band(s) on which the UE 104 is performing BFD for SCells. These values of $P_{BFD}$ are illustrated in the third row ("Option 3") of the table in FIG. 4. If Option 3 is adopted, then, at 1112, allocation of a dedicated measurement resource or searcher to the PCell is indicated, and allocation of a portion (e.g., fifty percent or one-half) of another measurement resource or searcher to the PSCell is indicated. This allocation scheme is illustrated in the third row ("Option 3") of the table in FIG. 5.

In a second example, application of the operation flow/algorithmic structures 300 and 1100 to extension enhancement of a CSI-RS based CBD evaluation period is described. In this example, the network and/or the UE 104 may be configured with a minimum assumption that, in case of multiple CCs in a single band, CBD is performed for only one of the CCs in the band.

If only one among the PCell and PSCell has been configured with CBD, then, at 316, the value of $P_{CBD}$ may be set to equal one for each CSI-RS resource in the set $\overline{q_1}$ configured for the PCell or the PSCell, and for each CSI-RS resource in the set $\overline{q_1}$ configured for an SCell, the value of $P_{CBD}$ may be set to equal the number of band(s) on which the UE 104 is performing CBD for SCells.

However, if both of the PCell and the PSCell have been configured with CBD, then, at 316, for each CSI-RS resource in the set $\overline{q_1}$ configured for the PCell or the PSCell, the value of $P_{CBD}$ may be set according to one of the following three options:

In a first option (Option 1), the value of $P_{CBD}$ may be set to equal one for the PCell, and the value of $P_{CBD}$ for the PSCell may be set to equal one more than the number of band(s) on which the UE 104 is performing CBD for SCells (e.g., the number of band(s) on which the UE 104 is performing BFD for SCells, plus one). For each CSI-RS resource in the set $\overline{q_1}$ configured for an SCell, the value of $P_{CBD}$ may also be set to equal one more than the number of band(s) on which the UE 104 is performing CBD for SCells. These values of $P_{CBD}$ are illustrated in the first row ("Option 1") of the table in FIG. 6.

If Option 1 is adopted, then, at 1112, allocation of a dedicated measurement resource or searcher to the PCell is indicated, and allocation of another measurement resource or searcher to be shared among the PSCell and the SCells on which the UE 104 is performing CBD is also indicated. This allocation scheme as applied to two searchers (searcher A and searcher B) is illustrated in the first row ("Option 1") of the table in FIG. 5.

In a second option (Option 2), the value of $P_{CBD}$ may be set to equal two for the PCell, and the value of $P_{CBD}$ may be set to equal two for the PSCell as well. For each CSI-RS resource in the set $\overline{q_1}$ configured for an SCell, the value of $P_{CBD}$ may be set to equal the number of band(s) on which the UE 104 is performing CBD for SCells. These values of $P_{CBD}$ are illustrated in the second row ("Option 2") of the table in FIG. 6. If Option 2 is adopted, then, at 1112, allocation of a measurement resource or searcher to be shared among the PCell and the PSCell is indicated. This allocation scheme is illustrated in the second row ("Option 2") of the table in FIG. 5.

In a third option (Option 3), the value of $P_{CBD}$ may be set to equal one for the PCell, and the value of $P_{CBD}$ may be set to equal two for the PSCell. For each CSI-RS resource in the set $\overline{q}_1$ configured for an SCell, the value of $P_{CBD}$ may be set to equal two times the number of band(s) on which the UE 104 is performing CBD for SCells. These values of $P_{CBD}$ are illustrated in the third row ("Option 3") of the table in FIG. 6. If Option 3 is adopted, then, at 1112, allocation of a dedicated measurement resource or searcher to the PCell is indicated, and allocation of a portion (e.g., fifty percent or one-half) of another measurement resource or searcher to the PSCell is indicated. This allocation scheme is illustrated in the third row ("Option 3") of the table in FIG. 5.

In a third example, application of the operation flow/algorithmic structures 300 and 1100 to extension enhancement of an SSB based CBD evaluation period is described. In this example, the network and/or the UE 104 may be configured with a minimum assumption that, in case of multiple CCs in a single band, CBD is performed for only one of the CCs in the band.

If only one among the PCell and PSCell has been configured with CBD, then, at 316, the value of $P_{CBD}$ may be set to equal one for each SSB resource in the set $\overline{q}_1$ configured for the PCell or the PSCell, and for each SSB resource in the set $\overline{q}_1$ configured for an SCell, the value of $P_{CBD}$ may be set to equal the number of band(s) on which the UE 104 is performing CBD for SCells.

However, if both of the PCell and the PSCell have been configured with CBD, then, at 316, for each SSB resource in the set $\overline{q}_1$ configured for the PCell or the PSCell, the value of $P_{CBD}$ may be set according to one of the following three options:

In a first option (Option 1), the value of $P_{CBD}$ may be set to equal one for the PCell, and the value of $P_{CBD}$ for the PSCell may be set to equal one more than the number of band(s) on which the UE 104 is performing CBD for SCells (e.g., the number of band(s) on which the UE 104 is performing BFD for SCells, plus one). For each SSB resource in the set $\overline{q}_1$ configured for an SCell, the value of $P_{CBD}$ may also be set to equal one more than the number of band(s) on which the UE 104 is performing CBD for SCells. These values of $P_{CBD}$ are illustrated in the first row ("Option 1") of the table in FIG. 6.

If Option 1 is adopted, then, at 1112, allocation of a dedicated measurement resource or searcher to the PCell is indicated, and allocation of another measurement resource or searcher to be shared among the PSCell and the SCells on which the UE 104 is performing CBD is also indicated. This allocation scheme as applied to two searchers (searcher A and searcher B) is illustrated in the first row ("Option 1") of the table in FIG. 5.

In a second option (Option 2), the value of $P_{CBD}$ may be set to equal two for the PCell, and the value of $P_{CBD}$ may be set to equal two for the PSCell as well. For each SSB resource in the set $\overline{q}_1$ configured for an SCell, the value of $P_{CBD}$ may be set to equal the number of band(s) on which the UE 104 is performing CBD for SCells. These values of $P_{CBD}$ are illustrated in the second row ("Option 2") of the table in FIG. 6. If Option 2 is adopted, then, at 1112, allocation of a measurement resource or searcher to be shared among the PCell and the PSCell is indicated. This allocation scheme is illustrated in the second row ("Option 2") of the table in FIG. 5.

In a third option (Option 3), the value of $P_{CBD}$ may be set to equal one for the PCell, and the value of $P_{CBD}$ may be set to equal two for the PSCell. For each SSB resource in the set $\overline{q}_1$ configured for an SCell, the value of $P_{CBD}$ may be set to equal two times the number of band(s) on which the UE 104 is performing CBD for SCells. These values of $P_{CBD}$ are illustrated in the third row ("Option 3") of the table in FIG. 6. If Option 3 is adopted, then, at 1112, allocation of a dedicated measurement resource or searcher to the PCell is indicated, and allocation of a portion (e.g., fifty percent or one-half) of another measurement resource or searcher to the PSCell is indicated. This allocation scheme is illustrated in the third row ("Option 3") of the table in FIG. 5.

In a fourth example, another application of the operation flow/algorithmic structures 300 and 1100 to extension enhancement of a CSI-RS based BFD evaluation period is described. In this example, the network and/or the UE 104 may be configured with a minimum assumption that, in case of multiple CCs in a single band, only one of BFD and CBD is performed for the band, and the BFD or CBD is performed for only one of the CCs in the band. In this example, the network and/or the UE 104 may be configured to not assume that BFD and CBD are running together in a same band in any certain period. In other words, the network and/or the UE 104 may be configured to assume that either BFD or CBD (but not both) is running in a band that is configured for BFD or CBD.

If only one among the PCell and PSCell has been configured with BFD or CBD (i.e., one has been configured with BFD or CBD, and the other has not been configured with BFD and has not been configured with CBD), then, at 316, the value of $P_{BFD}$ may be set to equal one for each CSI-RS resource in the set 42 configured for the PCell or the PSCell, and for each CSI-RS resource in the set 42 configured for an SCell, the value of $P_{BFD}$ may be set to equal the number of band(s) on which the UE 104 is performing BFD or CBD for SCells.

However, if the PCell has been configured with BFD or CBD and the PSCell has been configured with BFD or CBD (i.e., both configured with BFD, both configured with CBD, or one configured with BFD and the other configured with CBD), then, at 316, for each CSI-RS resource in the set 42 configured for the PCell or the PSCell, the value of $P_{BFD}$ may be set according to one of the following three options:

In a first option (Option 1), the value of $P_{BFD}$ may be set to equal one for the PCell, and the value of $P_{BFD}$ for the PSCell may be set to equal one more than the number of band(s) on which the UE 104 is performing BFD or CBD for SCells (e.g., the number of band(s) on which the UE 104 is performing BFD for SCells, plus the number of band(s) on which the UE 104 is performing CBD for SCells, plus one). For each CSI-RS resource in the set $\overline{q}_0$ configured for an SCell, the value of $P_{BFD}$ may also be set to equal one more than the number of band(s) on which the UE 104 is performing BFD or CBD for SCells. These values of $P_{BFD}$ are illustrated in the first row ("Option 1") of the table in FIG. 7.

If Option 1 is adopted, then, at 1112, allocation of a dedicated measurement resource or searcher to the PCell is indicated, and allocation of another measurement resource or searcher to be shared among the PSCell and the SCells on which the UE 104 is performing BFD or CBD is also indicated. This allocation scheme as applied to two searchers (searcher A and searcher B) is illustrated in the first row ("Option 1") of the table in FIG. 5.

In a second option (Option 2), the value of $P_{BFD}$ may be set to equal two for the PCell, and the value of $P_{BFD}$ may be set to equal two for the PSCell as well. For each CSI-RS resource in the set $\overline{q_0}$ configured for an SCell, the value of $P_{BFD}$ may be set to equal the number of band(s) on which the UE 104 is performing BFD or CBD for SCells. These values of $P_{BFD}$ are illustrated in the second row ("Option 2") of the table in FIG. 7. If Option 2 is adopted, then, at 1112, allocation of a measurement resource or searcher to be shared among the PCell and the PSCell is indicated. This allocation scheme is illustrated in the second row ("Option 2") of the table in FIG. 5.

In a third option (Option 3), the value of $P_{BFD}$ may be set to equal one for the PCell, and the value of $P_{BFD}$ may be set to equal two for the PSCell. For each CSI-RS resource in the set $\overline{q_0}$ configured for an SCell, the value of $P_{BFD}$ may be set to equal two times the number of band(s) on which the UE 104 is performing BFD or CBD for SCells. These values of $P_{BFD}$ are illustrated in the third row ("Option 3") of the table in FIG. 7. If Option 3 is adopted, then, at 1112, allocation of a dedicated measurement resource or searcher to the PCell is indicated, and allocation of a portion (e.g., fifty percent or one-half) of another measurement resource or searcher to the PSCell is indicated. This allocation scheme is illustrated in the third row ("Option 3") of the table in FIG. 5.

In a fifth example, another application of the operation flow/algorithmic structures 300 and 1100 to extension enhancement of a CSI-RS based or SSB based CBD evaluation period is described. In this example, the network and/or the UE 104 may be configured with a minimum assumption that, in case of multiple CCs in a single band, only one of BFD and CBD is performed for the band, and the BFD or CBD is performed for only one of the CCs in the band. In this example, the network and/or the UE 104 may be configured to not assume that BFD and CBD are running together in a same band in any certain period. In other words, the network and/or the UE 104 may be configured to assume that either BFD or CBD (but not both) is running in a band that is configured for BFD or CBD.

If only one among the PCell and PSCell has been configured with BFD or CBD (i.e., one has been configured with BFD or CBD, and the other has not been configured with BFD and has not been configured with CBD), then, at 316, the value of $P_{CBD}$ may be set to equal one for each CSI-RS or SSB resource in the set $\overline{q_1}$ configured for the PCell or the PSCell, and for each CSI-RS or SSB resource in the set $\overline{q_1}$ configured for an SCell, the value of $P_{CBD}$ may be set to equal the number of band(s) on which the UE 104 is performing BFD or CBD for SCells.

However, if the PCell has been configured with BFD or CBD and the PSCell has been configured with BFD or CBD (i.e., both configured with BFD, both configured with CBD, or one configured with BFD and the other configured with CBD), then, at 316, for each CSI-RS or SSB resource in the set $\overline{q_1}$ configured for the PCell or the PSCell, the value of $P_{CBD}$ may be set according to one of the following three options:

In a first option (Option 1), the value of $P_{CBD}$ may be set to equal one for the PCell, and the value of $P_{CBD}$ for the PSCell may be set to equal one more than the number of band(s) on which the UE 104 is performing BFD or CBD for SCells (e.g., the number of band(s) on which the UE 104 is performing BFD for SCells, plus the number of band(s) on which the UE 104 is performing CBD for SCells, plus one). For each CSI-RS or SSB resource in the set $\overline{q_1}$ configured for an SCell, the value of $P_{CBD}$ may also be set to equal one more than the number of band(s) on which the UE 104 is performing BFD or CBD for SCells. These values of $P_{CBD}$ are illustrated in the first row ("Option 1") of the table in FIG. 8.

If Option 1 is adopted, then, at 1112, allocation of a dedicated measurement resource or searcher to the PCell is indicated, and allocation of another measurement resource or searcher to be shared among the PSCell and the SCells on which the UE 104 is performing BFD or CBD is also indicated. This allocation scheme as applied to two searchers (searcher A and searcher B) is illustrated in the first row ("Option 1") of the table in FIG. 5.

In a second option (Option 2), the value of $P_{CBD}$ may be set to equal two for the PCell, and the value of $P_{CBD}$ may be set to equal two for the PSCell as well. For each CSI-RS or SSB resource in the set $\overline{q_1}$ configured for an SCell, the value of $P_{CBD}$ may be set to equal the number of band(s) on which the UE 104 is performing BFD or CBD for SCells. These values of $P_{CBD}$ are illustrated in the second row ("Option 2") of the table in FIG. 8. If Option 2 is adopted, then, at 1112, allocation of a measurement resource or searcher to be shared among the PCell and the PSCell is indicated. This allocation scheme is illustrated in the second row ("Option 2") of the table in FIG. 5.

In a third option (Option 3), the value of $P_{CBD}$ may be set to equal one for the PCell, and the value of $P_{CBD}$ may be set to equal two for the PSCell. For each CSI-RS or SSB resource in the set $\overline{q_1}$ configured for an SCell, the value of $P_{CBD}$ may be set to equal two times the number of band(s) on which the UE 104 is performing BFD or CBD for SCells. These values of $P_{CBD}$ are illustrated in the third row ("Option 3") of the table in FIG. 8. If Option 3 is adopted, then, at 1112, allocation of a dedicated measurement resource or searcher to the PCell is indicated, and allocation of a portion (e.g., fifty percent or one-half) of another measurement resource or searcher to the PSCell is indicated. This allocation scheme is illustrated in the third row ("Option 3") of the table in FIG. 5.

Figure 12:
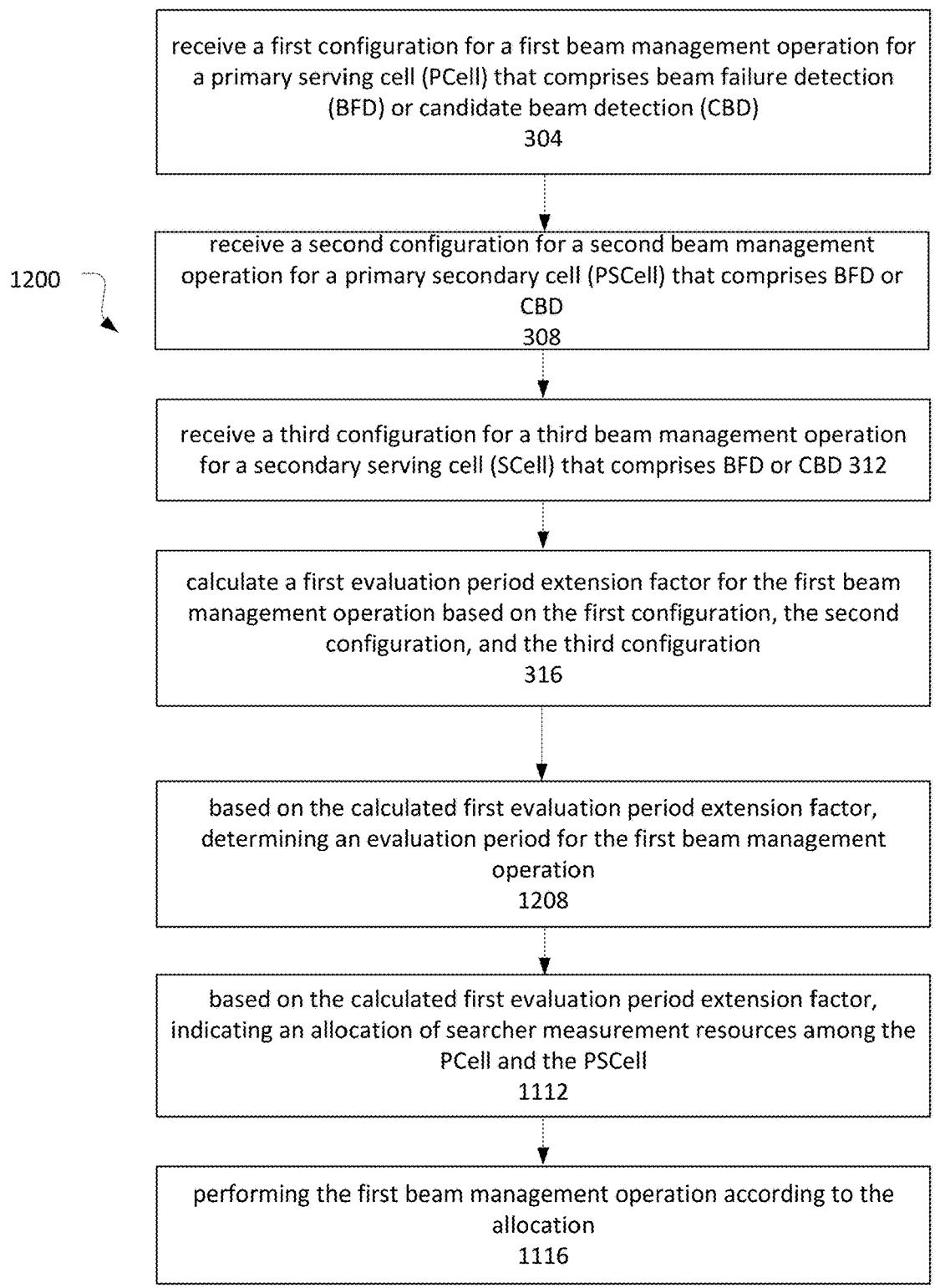
FIG. 12 illustrates a further operational flow/algorithmic structure in accordance with some embodiments.

FIG. 12 illustrates an operation flow/algorithmic structure 1200 in accordance with some embodiments. The operation flow/algorithmic structure 1200 may be performed or implemented by a UE such as, for example, UE 104 or UE 1000; or components thereof, for example, baseband processor 1004A.

The operation flow/algorithmic structure 1200 may include the operations 304, 308, 312, 316, 1112, and 1116 as described herein. The operation flow/algorithmic structure 1200 may further include, at 1208, based on the calculated first evaluation period extension factor, determining an evaluation period for the first beam management operation. For a case in which the first beam management operation is a CSI-RS-based BFD, for example, the UE 104 may determine the evaluation period according to the expression as defined in Tables 8.5.3.2-1 (for FR1) and 8.5.3.2-2 (for FR2) of TS 38.133 which corresponds to the frequency range and DRX cycle of the configuration for the first beam management operation. For a case in which the first beam management operation is an CSI-RS-based CBD, for example, the UE 104 may determine the evaluation period according to the expression as defined in Tables 8.5.6.2-1 (for FR1) and 8.5.6.2-2 (for FR2) of TS 38.133 which corresponds to the frequency range and DRX cycle of the configuration for the first beam management operation. For a case in which the first beam management operation is an SSB-based CBD, for example, the UE 104 may determine the evaluation period according to the expression as defined in Tables 8.5.5.2-1 (for FR1) and 8.5.5.2-2 (for FR2) of TS 38.133 which corresponds to the frequency range and DRX cycle of the configuration for the first beam management operation. The UE 104 may use this evaluation period determination to configure its measurement behavior. By determining this evaluation period, for example, the UE 104 can know how many samples (e.g., of the resource, such as CSI-RS or SSB) it can use for the evaluation, and how many beams it can sweep within this evaluation period.

For SSB based candidate beam detection, for example, the operation flow/algorithmic structure 300 may calculate, at 308, the evaluation period $T_{Evaluate\_CBD\_SSB}$ (in milliseconds (ms)) for Frequency Range 1 (FR1) as described in Table 8.5.5.2-1 of TS 38.133 as follows (where $T_{SSB}$ is the periodicity of SSB in the set, and $T_{DRX}$ is the Discontinuous Reception (DRX) cycle length):

1) for non-DRX configurations, and configurations in which the DRX cycle is not greater than 320 ms, $T_{Evaluate\_CBD\_SSB}=\max(25, \text{ceil}(3\times P\times P_{CBD})\times T_{SSB})$.

2) for configurations in which the DRX cycle is greater than 320 ms, $T_{Evaluate\_CBD\_SSB}=\text{ceil}(3\times P\times P_{CBD})\times T_{DRX})$, where the value of the parameter P is as described in section 8.5.5.2 of TS 38.133 (e.g., has a value of one when no measurement gap overlaps with any occasion of the SSB in the monitored cell, and is otherwise based on the measurement gap repetition period).

Figure 9:
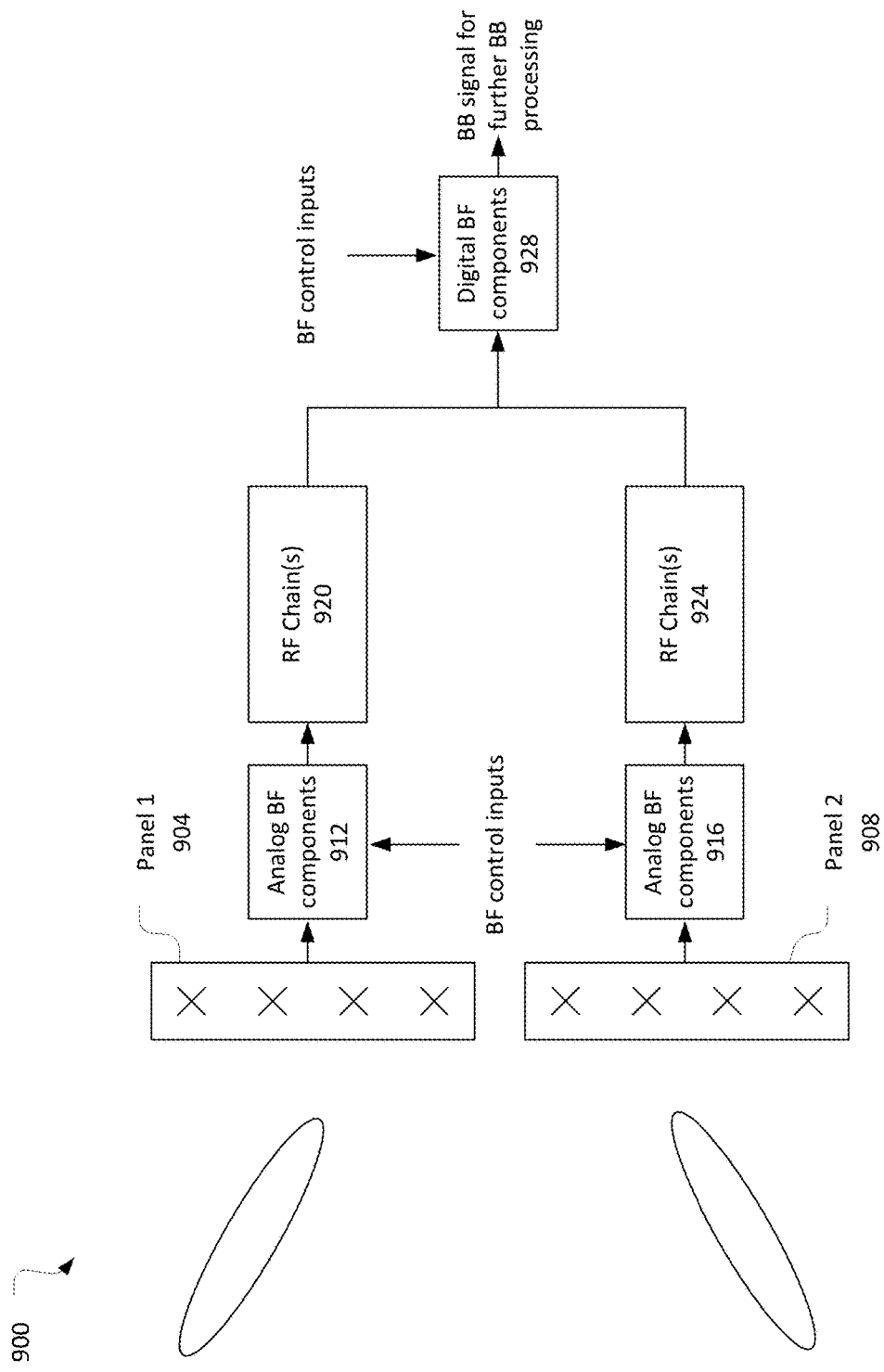
FIG. 9 illustrates beamforming components of a device in accordance with some embodiments.

FIG. 9 illustrates receive components 900 of a device in accordance with some embodiments. The device may be the UE 104 or serving cell 112, 114, 212, 214, 216, or 218. The receive components 900 may include a first antenna panel, panel 1 904, and a second antenna panel, panel 2 908. Each antenna panel may include a number of antenna elements.

The antenna panels may be coupled to respective analog beamforming (BF) components. For example, panel 1 904 may be coupled with analog BF components 912 and panel 2 908 may be coupled with analog BF components 916.

The analog BF components may be coupled with one or more radio-frequency (RF) chains. For example, analog BF components 912 may be coupled with one or more RF chains 920 and analog BF components 916 may be coupled with one or more RF chains 924. The RF chains may amplify a receive analog RF signal, downconvert the RF signal to baseband, and convert the analog baseband signal to a digital baseband signal, which may be provided to digital BF components 928. The digital BF components 928 may provide a baseband (BB signal) for further BB processing.

In various embodiments, control circuitry, which may reside in a baseband processor, may provide BF weights to the analog/digital BF components to provide a receive beam at respective antenna panels. These BF weights may be determined by the control circuitry based on received reference signals and corresponding QCL/TCI information as described herein. In some embodiments, the BF weights may be phase-shift values provided to phase shifters of the analog BF components 912 or complex weights provided to the digital BF components 928. In some embodiments, the BF components and antenna panels may operate together to provide a dynamic phased-array that is capable of directing the beams in the desired direction.

In various embodiments, beamforming may include analog, only digital, or a hybrid analog-digital beamforming. Digital beamforming may utilize separate RF chains that respectively correspond to the antenna elements.

While the beamforming components 900 describe receive beamforming, other embodiments may include beamforming components that perform transmit beamforming in analogous manners.

Figure 10:
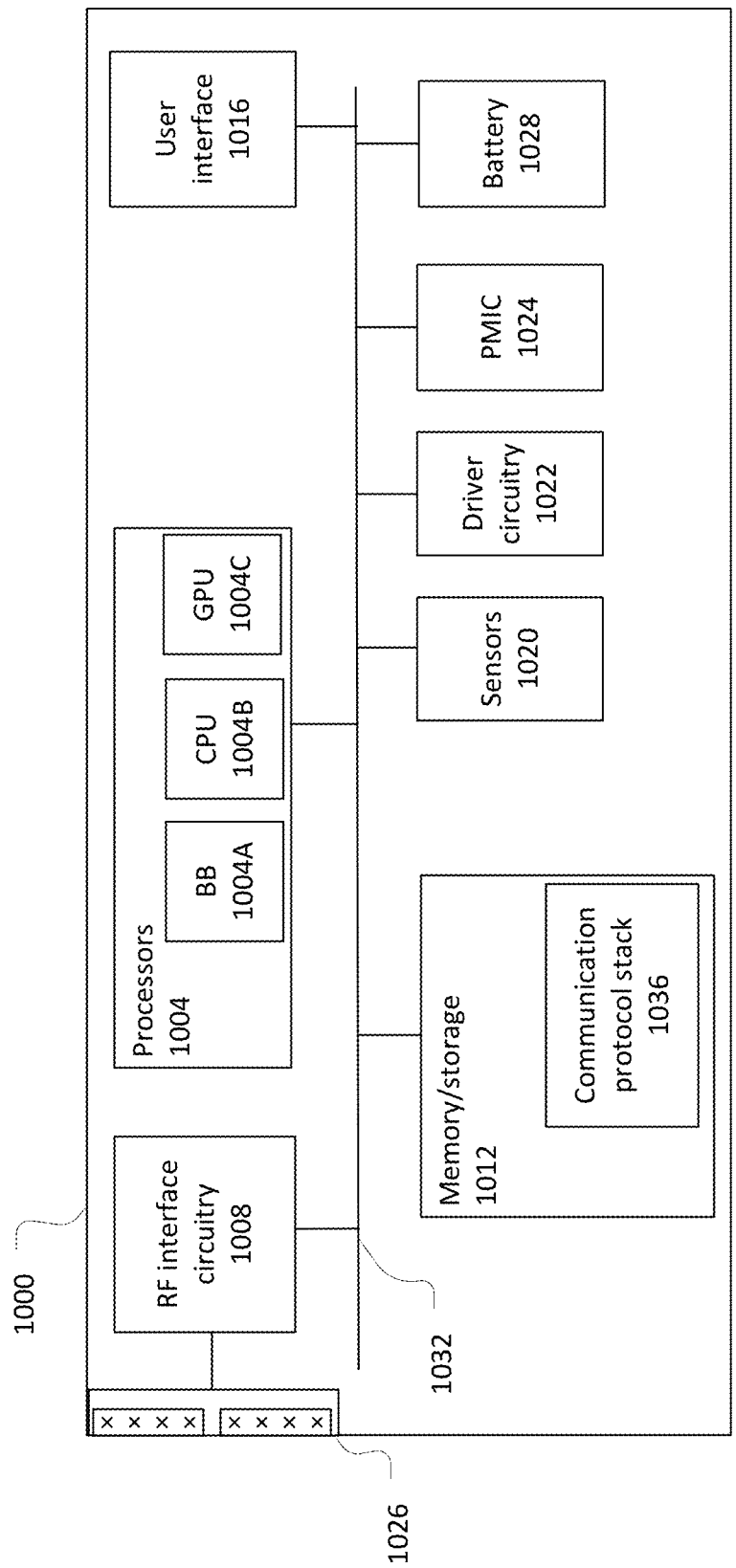
FIG. 10 illustrates a user equipment in accordance with some embodiments.

FIG. 10 illustrates a UE 1000 in accordance with some embodiments. The UE 1000 may be similar to and substantially interchangeable with UE 104 of FIGS. 1 and 2.

The UE 1000 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.), video surveillance/monitoring devices (for example, cameras, video cameras, etc.), wearable devices (for example, a smart watch), relaxed-IoT devices.

The UE 1000 may include processors 1004, RF interface circuitry 1008, memory/storage 1012, user interface 1016, sensors 1020, driver circuitry 1022, power management integrated circuit (PMIC) 1024, antenna structure 1026, and battery 1028. The components of the UE 1000 may be implemented as integrated circuits (ICs), portions thereof, discrete electronic devices, or other modules, logic, hardware, software, firmware, or a combination thereof. The block diagram of FIG. 10 is intended to show a high-level view of some of the components of the UE 1000. However, some of the components shown may be omitted, additional components may be present, and different arrangement of the components shown may occur in other implementations.

The components of the UE 1000 may be coupled with various other components over one or more interconnects 1032, which may represent any type of interface, input/output, bus (local, system, or expansion), transmission line, trace, optical connection, etc. that allows various circuit components (on common or different chips or chipsets) to interact with one another.

The processors 1004 may include processor circuitry such as, for example, baseband processor circuitry (BB) 1004A, central processor unit circuitry (CPU) 1004B, and graphics processor unit circuitry (GPU) 1004C. The processors 1004 may include any type of circuitry or processor circuitry that executes or otherwise operates computer-executable instructions, such as program code, software modules, or functional processes from memory/storage 1012 to cause the UE 1000 to perform operations as described herein.

In some embodiments, the baseband processor circuitry 1004A may access a communication protocol stack 1036 in the memory/storage 1012 to communicate over a 3GPP compatible network. In general, the baseband processor circuitry 1004A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum layer. In some embodiments, the PHY layer operations may additionally/alternatively be performed by the components of the RF interface circuitry 1008.

The baseband processor circuitry 1004A may generate or process baseband signals or waveforms that carry information in 3GPP-compatible networks. In some embodiments, the waveforms for NR may be based cyclic prefix OFDM "CP-OFDM" in the uplink or downlink, and discrete Fourier transform spread OFDM "DFT-S-OFDM" in the uplink.

The memory/storage 1012 may include one or more non-transitory, computer-readable media that includes instructions (for example, communication protocol stack 1036) that may be executed by one or more of the processors 1004 to cause the UE 1000 to perform various operations described herein. The memory/storage 1012 include any type of volatile or non-volatile memory that may be distributed throughout the UE 1000. In some embodiments, some of the memory/storage 1012 may be located on the processors 1004 themselves (for example, L1 and L2 cache), while other memory/storage 1012 is external to the processors 1004 but accessible thereto via a memory interface. The memory/storage 1012 may include any suitable volatile or non-volatile memory such as, but not limited to, dynamic random access memory (DRAM), static random access memory (SRAM), eraseable programmable read only memory (EPROM), electrically eraseable programmable read only memory (EEPROM), Flash memory, solid-state memory, or any other type of memory device technology.

The RF interface circuitry 1008 may include transceiver circuitry and radio frequency front module (RFEM) that allows the UE 1000 to communicate with other devices over a radio access network. The RF interface circuitry 1008 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via antenna structure 1026 and proceed to filter and amplify (with a low-noise amplifier) the signal. The signal may be provided to a receiver of the transceiver that down-converts the RF signal into a baseband signal that is provided to the baseband processor of the processors 1004.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 1026.

In various embodiments, the RF interface circuitry 1008 may be configured to transmit/receive signals in a manner compatible with NR access technologies.

The antenna 1026 may include antenna elements to convert electrical signals into radio waves to travel through the air and to convert received radio waves into electrical signals. The antenna elements may be arranged into one or more antenna panels. The antenna 1026 may have antenna panels that are omnidirectional, directional, or a combination thereof to enable beamforming and multiple input, multiple output communications. The antenna 1026 may include microstrip antennas, printed antennas fabricated on the surface of one or more printed circuit boards, patch antennas, phased array antennas, etc. The antenna 1026 may have one or more panels designed for specific frequency bands including bands in FR1 or FR2.

The user interface circuitry 1016 includes various input/output (I/O) devices designed to enable user interaction with the UE 1000. The user interface 1016 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes "LEDs" and multi-character visual outputs, or more complex outputs such as display devices or touchscreens (for example, liquid crystal displays "LCDs," LED displays, quantum dot displays, projectors, etc.), with the output of characters, graphics, multimedia objects, and the like being generated or produced from the operation of the UE 1000.

The sensors 1020 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, cameras or lensless apertures); light detection and ranging sensors; proximity sensors (for example, infrared radiation detector and the like); depth sensors; ambient light sensors; ultrasonic transceivers; microphones or other like audio capture devices; etc.

The driver circuitry 1022 may include software and hardware elements that operate to control particular devices that are embedded in the UE 1000, attached to the UE 1000, or otherwise communicatively coupled with the UE 1000. The driver circuitry 1022 may include individual drivers allowing other components to interact with or control various input/output (I/O) devices that may be present within, or connected to, the UE 1000. For example, driver circuitry 1022 may include a display driver to control and allow access to a display device, a touchscreen driver to control and allow access to a touchscreen interface, sensor drivers to obtain sensor readings of sensor circuitry 1020 and control and allow access to sensor circuitry 1020, drivers to obtain actuator positions of electro-mechanic components or control and allow access to the electro-mechanic components, a camera driver to control and allow access to an embedded image capture device, audio drivers to control and allow access to one or more audio devices.

The PMIC 1024 may manage power provided to various components of the UE 1000. In particular, with respect to the processors 1004, the PMIC 1024 may control power-source selection, voltage scaling, battery charging, or DC-to-DC conversion.

In some embodiments, the PMIC 1024 may control, or otherwise be part of, various power saving mechanisms of the UE 1000 including DRX as discussed herein.

A battery 1028 may power the UE 1000, although in some examples the UE 1000 may be mounted deployed in a fixed location, and may have a power supply coupled to an electrical grid. The battery 1028 may be a lithium ion battery, a metal-air battery, such as a zinc-air battery, an aluminum-air battery, a lithium-air battery, and the like. In some implementations, such as in vehicle-based applications, the battery 1028 may be a typical lead-acid automotive battery.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Examples

In the following sections, further exemplary embodiments are provided.

Example 1 includes a method comprising: receiving a first configuration for a first beam management operation for a primary serving cell (PCell) and a second configuration for a second beam management operation for a primary secondary cell (PSCell); calculating an extension factor that is based on the first and second configurations; based on the calculated extension factor, determining an evaluation period for the first beam management operation; based on the calculated extension factor, indicating an allocation of searcher measurement resources among the PCell and the PSCell; and performing the first beam management operation according to the allocation, wherein the first beam management operation comprises beam failure detection (BFD) or candidate beam detection (CBD) and wherein the second beam management operation comprises BFD or CBD, and wherein the allocation of searcher measurement resources comprises an allocation of a portion of a first searcher to the PCell.

Example 2 includes the method of example 1 or some other example herein, wherein the extension factor is further based on a configuration for BFD or CBD for a secondary serving cell (SCell) of a cell group of the PCell.

Example 3 includes the method of example 1 or some other example herein, the allocation of a portion of the first searcher to the PCell comprises an allocation of the first searcher to the PCell.

Example 4 includes the method of example 3 or some other example herein, wherein the allocation of searcher measurement resources comprises an allocation of a second searcher among the PSCell and another serving cell that is not the PCell.

Example 5 includes the method of example 3 or some other example herein, wherein the allocation of searcher measurement resources comprises an allocation of at least half of the second searcher to the PSCell.

Example 6 includes the method of example 1 or some other example herein, wherein the allocation of searcher measurement resources comprises an allocation of the first searcher to the PCell and to the PSCell.

Example 7 includes the method of example 6 or some other example herein, wherein the allocation of the first searcher to the PCell and to the PSCell comprises an allocation of the first searcher equally among the PCell and the PSCell.

Example 8 includes the method of any one of examples 1-7 or some other example herein, wherein the calculated extension factor is based on a frequency range of the configuration for the first beam management operation.

Example 9 may include one or more non-transitory computer-readable media comprising instructions to cause an electronic device (e.g., a UE), upon execution of the instructions by one or more processors of the electronic device, to: calculate an extension factor that is based on a configuration for a first beam management operation for a primary serving cell (PCell) and on a configuration for a second beam management operation for a primary secondary cell (PSCell); based on the calculated extension factor, determine an evaluation period for the first beam management operation; based on the calculated extension factor, indicate an allocation of searcher measurement resources among the PCell and the PSCell; and perform the first beam management operation according to the allocation, wherein the first beam management operation comprises beam failure detection (BFD) or candidate beam detection (CBD) and wherein the second beam management operation comprises BFD or CBD, and wherein the allocation of searcher measurement resources comprises an allocation of a portion of a first searcher to the PCell.

Example 10 includes the one or more computer-readable media of example 9 or some other example herein, wherein the extension factor is further based on a configuration for BFD or CBD for a secondary serving cell (SCell) of a cell group of the PCell.

Example 11 includes the one or more computer-readable media of example 9 or some other example herein, wherein the allocation of a portion of the first searcher to the PCell comprises an allocation of the first searcher to the PCell.

Example 12 includes the one or more computer-readable media of example 11 or some other example herein, wherein the allocation of searcher measurement resources comprises an allocation of a second searcher among the PSCell and another serving cell that is not the PCell.

Example 13 includes the one or more computer-readable media of example 11 or some other example herein, wherein the allocation of searcher measurement resources comprises an allocation of at least half of the second searcher to the PSCell.

Example 14 includes the one or more computer-readable media of example 9 or some other example herein, wherein the allocation of searcher measurement resources comprises an allocation of the first searcher to the PCell and to the PSCell.

Example 15 includes the one or more computer-readable media of example 14 or some other example herein, wherein the allocation of the first searcher to the PCell and to the PSCell comprises an allocation of the first searcher equally among the PCell and the PSCell.

Example 16 includes the one or more computer-readable media of any one of examples 9-15 or some other example herein, wherein the calculated extension factor is based on a frequency range of the configuration for the first beam management operation.

Example 17 may include a user equipment comprising memory to store a first configuration for a first beam management operation for a primary serving cell (PCell) and a second configuration for a second beam management operation for a primary secondary cell (PSCell); and processing circuitry coupled with the memory, the processing circuitry to: calculate an extension factor that is based on the first and second configurations; based on the calculated extension factor, indicate an allocation of searcher measurement resources among the PCell and the PSCell; and perform the first beam management operation according to the allocation, wherein the first beam management operation comprises beam failure detection (BFD) or candidate beam detection (CBD) and wherein the second beam management operation comprises BFD or CBD, and wherein the allocation of searcher measurement resources comprises an allocation of a portion of a first searcher to the PCell.

Example 18 includes the user equipment of example 17 or some other example herein, wherein the extension factor is further based on a configuration for BFD or CBD for a secondary serving cell (SCell) of a cell group of the PCell.

Example 19 includes the user equipment of example 17 or some other example herein, wherein the allocation of a portion of the first searcher to the PCell comprises an allocation of the first searcher to the PCell.

Example 20 includes the user equipment of example 19 or some other example herein, wherein the allocation of searcher measurement resources comprises an allocation of a second searcher among the PSCell and another serving cell that is not the PCell.

Example 21 may include an apparatus comprising means to perform one or more elements of a method described in or related to any of examples 1-8, or any other method or process described herein.

Example 22 may include one or more non-transitory computer-readable media comprising instructions to cause an electronic device, upon execution of the instructions by one or more processors of the electronic device, to perform one or more elements of a method described in or related to any of examples 1-8, or any other method or process described herein.

Example 23 may include an apparatus comprising logic, modules, or circuitry to perform one or more elements of a method described in or related to any of examples 1-8, or any other method or process described herein.

Example 24 includes a method of beam management comprising receiving a first configuration for a first beam management operation for a primary serving cell (PCell) that comprises beam failure detection (BFD) or candidate beam detection (CBD); receiving a second configuration for a second beam management operation for a primary secondary cell (PSCell) that comprises BFD or CBD; receiving a third configuration for a third beam management operation for a secondary serving cell (SCell) that comprises BFD or CBD; and calculating a first evaluation period extension factor for the first beam management operation based on the first configuration, the second configuration, and the third configuration, wherein the third beam management operation is on a different frequency band than the first beam management operation, and wherein the third beam management operation is on a different frequency band than the second beam management operation.

Example 25 may include the method of example 24 or some other example herein, wherein the calculated first evaluation period extension factor has a value equal to one, and the method further comprising indicating, based on the calculated first evaluation period extension factor, an allocation of a first searcher to the PCell.

Example 26 may include a method, technique, or process as described in or related to any of examples 1-25, or portions or parts thereof.

Example 27 may include an apparatus comprising: one or more processors and one or more computer-readable media comprising instructions that, when executed by the one or more processors, cause the one or more processors to perform the method, techniques, or process as described in or related to any of examples 1-8, 24, or 25, or portions thereof.

Example 28 may include a signal as described in or related to any of examples 1-20, 24, or 25, or portions or parts thereof.

Example 29 may include a datagram, information element, packet, frame, segment, PDU, or message as described in or related to any of examples 1-20, 24, or 25, or portions or parts thereof, or otherwise described in the present disclosure.

Example 30 may include a signal encoded with data as described in or related to any of examples 1-20, 24, or 25, or portions or parts thereof, or otherwise described in the present disclosure.

Example 31 may include a signal encoded with a datagram, IE, packet, frame, segment, PDU, or message as described in or related to any of examples 1-20, 24, or 25, or portions or parts thereof, or otherwise described in the present disclosure.

Example 32 may include an electromagnetic signal carrying computer-readable instructions, wherein execution of the computer-readable instructions by one or more processors is to cause the one or more processors to perform the method, techniques, or process as described in or related to any of examples 1-20, 24, or 25, or portions thereof.

Example 33 may include a computer program comprising instructions, wherein execution of the program by a processing element is to cause the processing element to carry out the method, techniques, or process as described in or related to any of examples 1-20, 24, or 25, or portions thereof.

Example 34 may include a signal in a wireless network as shown and described herein.

Example 35 may include a method of communicating in a wireless network as shown and described herein.

Example 36 may include a system for providing wireless communication as shown and described herein.

Example 37 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. One or more non-transitory computer-readable media having instructions that, when executed cause processor circuitry to:
   receive a first configuration for a first beam management operation for a primary serving cell (PCell), the first beam management operation comprising beam failure detection (BFD) or candidate beam detection (CBD);
   receive a second configuration for a second beam management operation for a primary secondary cell (PSCell), the second beam management operation comprising BFD or CBD;
   receive a third configuration for a third beam management operation for a secondary serving cell (SCell), the third beam management operation comprising BFD or CBD; and
   calculate a first evaluation period extension factor for the second beam management operation based on the third configuration, wherein the third beam management operation is on a different frequency band than the first beam management operation.

2. The one or more non-transitory computer-readable media of claim 1, wherein the calculated first evaluation period extension factor has a value equal to one, and
the one or more non-transitory computer-readable media having further instructions that, when executed, further cause the processor circuitry to indicate, based on the calculated first evaluation period extension factor, an allocation of a first searcher to the PCell.

3. The one or more non-transitory computer-readable media of claim 2, the one or more non-transitory computer-readable media having further instructions that, when executed, further cause the processor circuitry to calculate a second evaluation period extension factor for the second beam management operation based on the first configuration, the second configuration, and the third configuration,
wherein the calculated second evaluation period extension factor has a value equal to one plus a number of frequency bands on which a user equipment (UE) is configured to perform BFD or CBD for any secondary serving cell, and
the one or more non-transitory computer-readable media having further instructions that, when executed, further cause the processor circuitry to indicate, based on the calculated second evaluation period extension factor, an allocation of a second searcher among the PSCell and any secondary serving cells on which BFD or CBD are configured,
the one or more non-transitory computer-readable media having further instructions that, when executed, cause the processor circuitry to calculate a third evaluation period extension factor for the third beam management operation based on the first configuration, the second configuration, and the third configuration,
wherein the calculated third evaluation period extension factor has a value equal to one plus the number of frequency bands on which the processor circuitry is configured to perform BFD or CBD for any secondary serving cell.

4. The one or more non-transitory computer-readable media of claim 1, wherein the calculated first evaluation period extension factor has a value equal to two, and
the one or more non-transitory computer-readable media having further instructions that, when executed, further cause the processor circuitry to indicate, based on the calculated first evaluation period extension factor, an allocation of a first searcher to the PCell and to the PSCell,
the one or more non-transitory computer-readable media having further instructions that, when executed further cause the processor circuitry to calculate a second evaluation period extension factor for the second beam management operation based on the first configuration, the second configuration, and the third configuration,
wherein the calculated second evaluation period extension factor has a value equal to two.

5. The one or more non-transitory computer-readable media of claim 4, the one or more non-transitory computer-readable media having further instructions that, when executed, further cause the processor circuitry to indicate an allocation of a second searcher among any secondary serving cells on which BFD or CBD are configured,
the one or more non-transitory computer-readable media having further instructions that, when executed, further cause the processor circuitry to calculate a third evaluation period extension factor for the third beam management operation based on the first configuration, the second configuration, and the third configuration,
wherein the calculated third evaluation period extension factor has a value equal to a number of frequency bands on which the processor circuitry is configured to perform BFD or CBD for any secondary serving cell.

6. The one or more non-transitory computer-readable media of claim 2, the one or more non-transitory computer-readable media having further instructions that, when executed, further cause the processor circuitry to calculate a second evaluation period extension factor for the second beam management operation based on the first configuration, the second configuration, and the third configuration,
wherein the calculated second evaluation period extension factor has a value equal to two,
the one or more non-transitory computer-readable media having further instructions that, when executed, further cause the processor circuitry to indicate, based on the calculated second evaluation period extension factor, an allocation of a first portion of a second searcher to the PSCell.

7. The one or more non-transitory computer-readable media of claim 6, the one or more non-transitory computer-readable media having further instructions that, when executed, further cause the processor circuitry to indicate an allocation of a second portion of the second searcher among any secondary serving cells on which BFD or CBD are configured.

8. The one or more non-transitory computer-readable media of claim 7, the one or more non-transitory computer-readable media having further instructions that, when executed, further cause the processor circuitry to calculate a third evaluation period extension factor for the third beam management operation based on the first configuration, the second configuration, and the third configuration,
wherein the calculated third evaluation period extension factor has a value equal to two times a number of frequency bands on which the processor circuitry is configured to perform BFD or CBD for any secondary serving cell.

9. The one or more non-transitory computer-readable media of claim 1, wherein the first beam management operation comprises BFD,
and wherein at least one of the second beam management operation and the third beam management operation comprises CBD.

10. An apparatus comprising:
processor circuitry to:
receive a first configuration for a first beam management operation for a primary serving cell (PCell), the first beam management operation comprising beam failure detection (BFD) or candidate beam detection (CBD),
receive a second configuration for a second beam management operation for a primary secondary cell (PSCell), the second beam management operation comprising BFD or CBD,
receive a third configuration for a third beam management operation for a secondary serving cell (SCell), the third beam management operation comprising BFD or CBD, and
calculate a first evaluation period extension factor for the second beam management operation based on the third configuration, wherein the third beam management operation is on a different frequency band than the first beam management operation; and interface circuitry coupled with the processor circuitry to enable communication.

11. The apparatus of claim 10, wherein the calculated first evaluation period extension factor has a value equal to one, and
wherein the processor circuitry further to indicate, based on the calculated first evaluation period extension factor, an allocation of a first searcher to the PCell.

12. The apparatus of claim 11, wherein the processor circuitry further to calculate a second evaluation period extension factor for the second beam management operation based on the first configuration, the second configuration, and the third configuration,
wherein the calculated second evaluation period extension factor has a value equal to one plus a number of frequency bands on which the apparatus is configured to perform BFD or CBD for any secondary serving cell, and
wherein the processor circuitry further to indicate, based on the calculated second evaluation period extension factor, an allocation of a second searcher among the PSCell and any secondary serving cells on which BFD or CBD are configured.

13. The apparatus of claim 10, wherein the calculated first evaluation period extension factor has a value equal to two, and
the processor circuitry further to indicate, based on the calculated first evaluation period extension factor, an allocation of a first searcher to the PCell and to the PSCell.

14. The apparatus of claim 13, wherein the processor circuitry further to indicate an allocation of a second searcher among any secondary serving cells on which BFD or CBD are configured.

15. The apparatus of claim 10, wherein the processor circuitry further to calculate a second evaluation period extension factor for the second beam management operation based on the first configuration, the second configuration, and the third configuration,
wherein the calculated second evaluation period extension factor has a value equal to two,
the processor circuitry further to indicate, based on the calculated second evaluation period extension factor, an allocation of a first portion of a second searcher to the PSCell.

16. The apparatus of claim 15, wherein the processor circuitry further to indicate an allocation of a second portion of the second searcher among any secondary serving cells on which BFD or CBD are configured.

17. The apparatus of claim 16, wherein the processor circuitry further to calculate a third evaluation period extension factor for the third beam management operation based on the first configuration, the second configuration, and the third configuration,
wherein the calculated third evaluation period extension factor has a value equal to two times a number of frequency bands on which the apparatus is configured to perform BFD or CBD for any secondary serving cell.

18. The apparatus of claim 10, wherein the first beam management operation comprises BFD,
and wherein at least one of the second beam management operation and the third beam management operation comprises CBD.

19. A method of beam management, the method comprising:
receiving a first configuration for a first beam management operation for a primary serving cell (PCell), the first beam management operation comprising beam failure detection (BFD) or candidate beam detection (CBD);
receiving a second configuration for a second beam management operation for a primary secondary cell (PSCell), the second beam management operation comprising BFD or CBD;
receiving a third configuration for a third beam management operation for a secondary serving cell (SCell), the third beam management operation comprising BFD or CBD;
calculating a first evaluation period extension factor for the second beam management operation based on the third configuration; and
based on the calculated first evaluation period extension factor, determining an evaluation period for the first beam management operation,
wherein the third beam management operation is on a different frequency band than the first beam management operation.

20. The method of claim 19, wherein the calculated first evaluation period extension factor has a value equal to one, and
the method further comprising indicating, based on the calculated first evaluation period extension factor, an allocation of a first searcher to the PCell.

* * * * *